Dec. 15, 1959  L. HOFMANN  2,916,832
HELICOPTER TRAINER MOUNTED ON FLOAT
Filed Nov. 5, 1956  3 Sheets-Sheet 1

INVENTOR:
Ludwig Hofmann
BY: Michael S Striker
Agt.

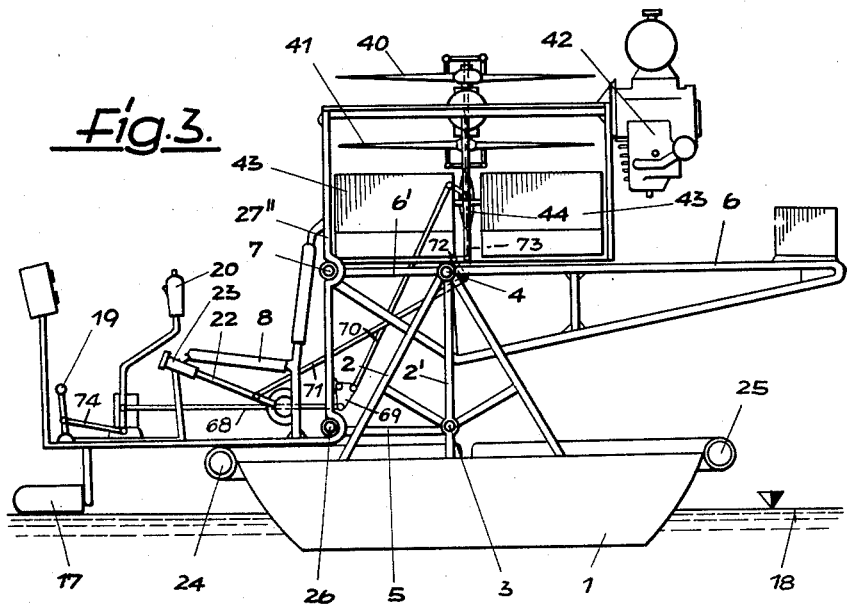
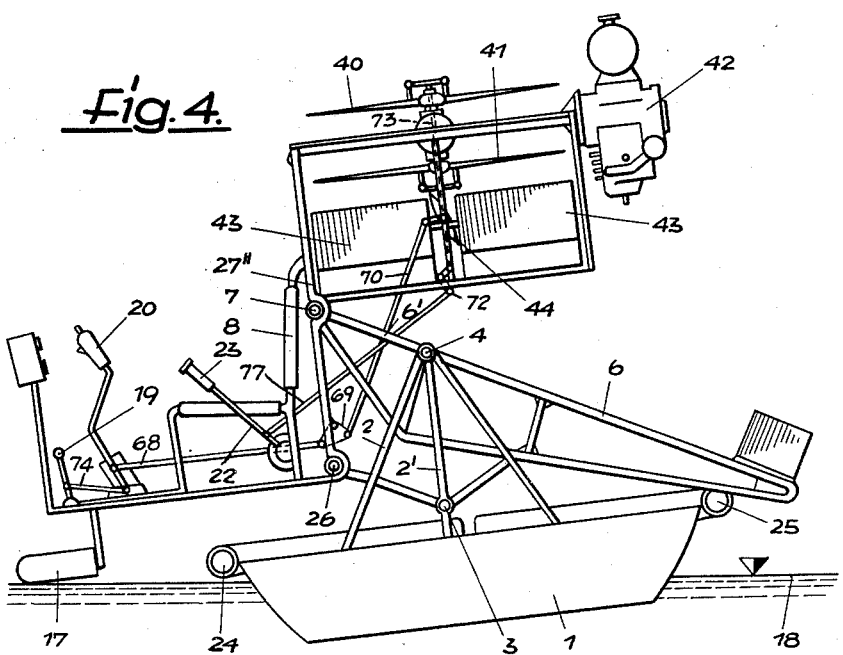

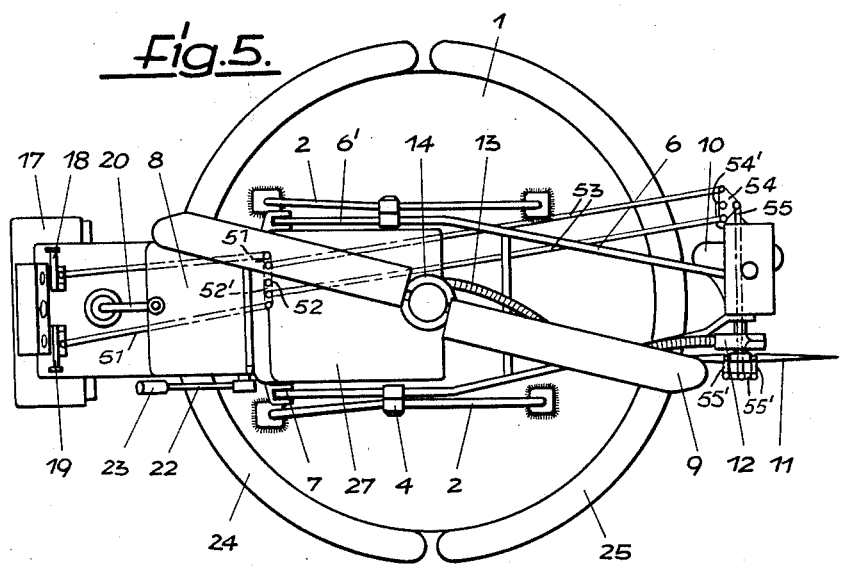
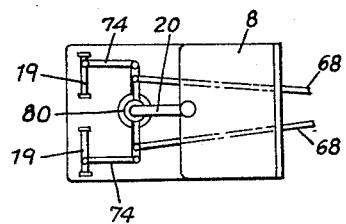

United States Patent Office 2,916,832
Patented Dec. 15, 1959

2,916,832

HELICOPTER TRAINER MOUNTED ON FLOAT

Ludwig Hofmann, Buhl, Baden, Germany, assignor to Firma Bölkow-Entwicklungen Kommanditgesellschaft, Stuttgart-Flughafen, Germany Application November 5, 1956, Serial No. 620,303

Claims priority, application Germany November 4, 1955

14 Claims. (Cl. 35—12)

The present invention relates to helicopter trainers used for training pilots to fly helicopters.

Helicopters have an exceedingly large number of controls and a considerable amount of time is required for a pilot simply to acquaint himself with all of the controls so that he can use them intelligently. When a pilot is trained to fly a helicopter during flight in a helicopter a considerable amount of valuable flying time is devoted only to acquainting the pilot with the many controls, and as a result a large number of flying hours are wasted and valuable equipment is placed in danger.

It has already been proposed to overcome the above drawbacks by providing trainers which do not fly and which serve the purpose of acquainting a pilot with the various controls of a helicopter. However, these conventional training devices either are extremely complex and therefore undesirably expensive or they are so primitive and simple that they only have a very small instructive value.

It is an object of the present invention to provide a helicopter trainer which is fairly inexpensive and which at the same time is capable of fully acquainting a pilot with the controls of a helicopter.

Another object of the present invention is to provide a fairly inexpensive apparatus which is capable of moving about without flying and which is at the same time capable of giving the pilot the same sensations which he would have if he were flying a real helicopter.

A further object of the present invention is to provide structure capable of accomplishing all of the above objects and at the same time being composed of simple and ruggedly constructed elements which are very reliable in operation.

With the above objects in view the present invention mainly consists of a helicopter trainer which includes a float which is adapted to float upon the surface of a body of liquid. A framework is located adjacent the float and carries a pilot seat as well as a helicopter rotor, and the framework also carries suitable controls adjacent the pilot seat for controlling the rotor. This framework is connected to the float by a mounting means which mounts the framework for elevational movement with respect to the float while preventing any change in the inclination of the framework with respect to the float, so that the vertical movement of the framework with respect to the float simulates flying conditions where changes in elevation take place, the trainer also being capable of effecting horizontal movement in any desired direction.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 3 is a side elevational view of a third embodiment of a helicopter trainer according to the present invention;

Fig. 4 shows the structure of Fig. 3 in one of the positions which it may take during use of the structure;

Fig. 5 is a top plan view of the structure of Fig. 1; and

Fig. 6 is a fragmentary top plan view of the control stick and rudder pedals of Figs. 3 and 4 showing how these pedals are connected to the rudders.

Figure 1:
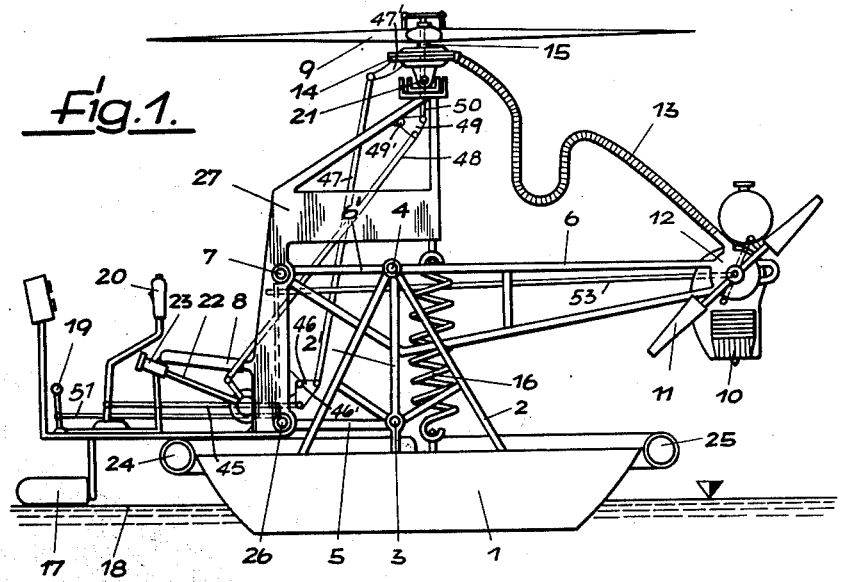
Fig. 1 is a diagrammatic side elevational view of a trainer according to the present invention, this trainer having a tail rotor in addition to a main rotor.

Referring now to Figs. 1 and 5, it will be seen that the structure of the invention includes a float 1 which floats upon the surface 18 of a suitable body of liquid. A framework 2, 2' is fixed to and extends upwardly from the float 1. A lever 5 is pivotally connected at 3 to the framework 2, 2' and a double-armed lever 6, 6' is pivotally carried by the framework 2, 2' at 4. The left free end of the arm 6' is pivotally connected at 7 to a framework 27 which carries a pilot seat 8 and a main helicopter rotor 9. Moreover, the lever 5 is pivotally connected at 26 to the framework 27. Thus, the framework 2, 2' together with the levers 5 and 6' serve as a parallelogram linkage mounting means for mounting the framework 27 together with the pilot seat 8 and a main rotor 9 for elevational movement with respect to the float 1 and the framework 2, 2' connected thereto without changing the inclination of the framework 27 and seat 8 with respect to the float, this prevention of a change of inclination being brought about by the parallelogram linkage, as is well known.

The right free end of the arm 6, as viewed in Figs. 1 and 5, carries a weight which acts as a counterbalance for the pilot seat 8 and the framework 27, and this counterbalance means takes the form of the drive motor 10 and the tail propeller 11 which is driven by the drive motor 10. This drive motor 10 drives, in addition to the tail rotor 11, an oil pump 12 which communicates through a flexible hydraulic conduit 13 with an oil motor 14 for driving the latter, and the drive shaft 15 of the oil motor 14 is fixed to the main rotor 9 so that the latter is driven by the oil motor 14. A suitable tank and conduit are provided for supplying oil to the pump 12 to be sucked thereby, and a suitable return conduit extends from the oil motor 14 back to the tank, this tank and the conduit cooperating therewith being omitted from the drawings for the sake of clarity.

A spring 16 is connected at its lower end to the float 1 and at its upper end to the framework 27 so as to urge the latter together with the pilot seat 8 downwardly until an additional float or pontoon 17 connected to and carried by the framework 27 engages the surface 18 of the body of liquid. The float 17, which may be in the form of a pair of individual floats, if desired, provides a resistance to movement of the framework downwardly after the additional float 17 engages the body of liquid, and in this way the float 17 serves to limit the downward movement of the pilot seat 8. The framework 27 carries a pair of foot pedals 19 for controlling the angle of the rotor 11.

The oil motor 14 together with the main rotor 9 carried and driven thereby are mounted on the framework 27 for turning movement about a longitudinal horizontal axis and about a transverse horizontal axis by the universal joint 21, and a control stick 20 is located adjacent the seat 8 to enable the pilot to control the inclination of the oil motor 14 and rotor 9 about these horizontal axes. The pitch of the rotor blades of the rotor 9 can collectively be adjusted by the lever 22, and this lever turnably carries a handle 23 which may be turned in order to control the throttling of the drive motor 10.

The foot pedals 19 control the pitch of the blades of rotor 11. For this purpose the pedals 19 are respectively connected with the ends of a pair of rods 51 whose opposite ends are respectively connected with a two-armed lever 51′ connected at its center with a vertical bar 52 which is supported for turning movement about its axis and which fixedly carries at its upper end a two-armed lever 52′ whose ends are respectively connected with a pair of cables 53 which are in turn connected with a pair of the ends of a three-arm lever 54 turnably supported by the motor 10 for turning movement about the vertical pivot pin 54′. The lever 54 is in the form of a triangular plate having two of its corners connected respectively with the cables 53 as shown in Fig. 5. The third corner is connected with a rod 55 whose end distant from lever 54 is connected with linkages 55′ (Fig. 5) which in turn are connected with the blades of the propeller 11 for changing the pitch thereof when the rod 55 is axially shifted by actuation of pedals 19.

The control stick 20 adjusts the position of rotor 9 and motor 14 through the universal joint 21 with respect to the longitudinal and transverse axes of the craft. To prevent the drawings from having so much structure that they are rendered unclear, there is illustrated only the linkage for turning the main rotor at the joint 21 with respect to the transverse axis. For this purpose the stick 20 is connected by a rod 45 with one arm of a lever 46 which is pivotally supported at 46′ (Fig. 1) for turning movement about a transverse horizontal axis. The other arm of the lever 46 is connected by the rod 47 with an arm 47′ which is fixed to the housing of motor 14 so that through this linkage forward and rearward turning of the stick 20 will result in turning of the main rotor about a transverse horizontal axis.

The lever 22 is connected with a rod 48 which is in turn connected with a lever 49 supported on pivot pin 49′ for turning movement about a horizontal transverse axis, and the lever 49 is connected with a rod 50 which shifts axially upon turning of lever 22 and which adjusts the pitch of the blades of rotor 9 with a structure similar to that actuated by rod 55 for changing the pitch of propeller 11.

The rotary handle 23, as is known in many motorized vehicles, is connected with the gas lever of motor 10 through an unillustrated Bowden cable, for example.

The configuration of the float 1 is such that it is capable of tilting with respect to the liquid surface 18. At the same time, the configuration of the float 1 is such that it presents a certain resistance to such tilting. Thus, a means is carried by the float 1 at the exterior upper edge thereof for limiting the tilting of the float 1, and this means takes the form of a pair of hollow tubes 24 and 25 fixed to the float 1 and extending along the upper periphery thereof, as indicated in Fig. 1 where the tubes 24 and 25 are shown in section.

The arrangement of the drive motor 10 and the parts connected thereto in order to act as a counterweight is such that when the rotors are stationary a balance is obtained through the levers 6, 6′ about the pivot axis 4 when the pilot student is on the pilot seat 8. The drive motor 10 drives the rotor 9 through the pump 12, the flexible conduit 13, and the oil motor 14. The thrust which is created in the direction of the axis of rotation of the rotor 9 raises the pilot seat until a balance is obtained between this upward air force and the downward pull of the tensioned spring 16. By adjusting the throttle of the motor 10 and the pitch of the blades of the rotor 9 the thrust of the rotor and thus the elevation of the pilot seat 8 can be regulated, and this operation corresponds to the maintenance of a predetermined flying height. By changing the inclination of the rotor 9 horizontal air forces acting on the trainer are provided, and these horizontal forces provide longitudinal or lateral movement of the entire assembly together with the float, and thus this operation is similar to that of a helicopter rotor in free flight when the inclination of the helicopter rotor is regulated. The thrust of the tail rotor 11 is capable of providing a turning of the entire assembly about a vertical axis as well as providing a reaction force opposing forces provided by the rotor 9 so as to maintain a desired balance, the action taking place in the same way that the actions occur during flight, so that the pilot student is familiarized with the problems which must be overcome during flight in order to maintain equilibrium conditions. The apparatus is capable of negotiating forward or rearward movements on the water, as well as turning and lateral movements, so that a close simulation of actual flying conditions is obtained.

Figure 2:
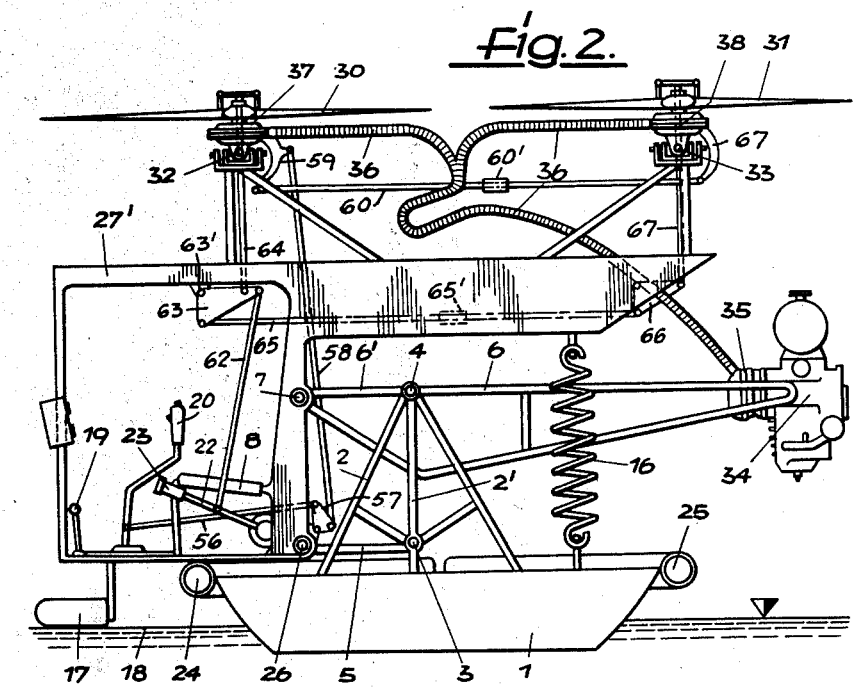
Fig. 2 is a diagrammatic side elevational view of another embodiment of a trainer according to the present invention.

Except for the differences now to be described, the structure of Fig. 2 is the same as that of Fig. 1. Fig. 2 shows a tandem arrangement of rotors, and the tail rotor is omitted. Thus, referring to Fig. 2 it will be seen that this embodiment of the invention is provided with a framework 27′ somewhat different from the framework 27 and carrying a forward rotor 30 and a rear rotor 31. Both of these rotors are respectively supported by the universal joints 32 and 33 so that the inclinations of these rotors can be adjusted, and the pitch of each rotor can be adjusted independently of the pitch of the blades of the other rotor. Similarly to the embodiment of Fig. 1, the stick 20 of Fig. 2 is connected by a linkage 56, 57, 58 with an arm 59 fixed to the housing of the oil motor 37 of the rotor 30. Moreover, the arm 59 is connected through a rod 60 with an arm 61 fixed to the housing of the motor 38, so that when the stick 20 is turned forwardly and rearwardly both of the rotors will turn about the transverse horizontal axes provided by universal joints 32 and 33. A corresponding unillustrated linkage is provided for turning the rotors about the longitudinal axis, and the same is true of the embodiment of Fig. 1. In order to be able to adjust the angular position of one of the rollers with respect to the other the rod 60 has a pair of sections which are oppositely threaded at their adjacent ends and which cooperate with oppositely threaded parts of a nut 60′ so that turning of the latter lengthens or shortens the rod 60. In a manner similar to the embodiment of Fig. 1 the lever 22 is connected through a rod 62, a lever 63 turnable at 63′ and a rod 64 with the blades of rotor 30 for adjusting pitch thereof, and a rod 65 interconnects lever 63 with a lever 66 connected to a rod 67 so that the latter shifts axially simultaneously with the rod 64 for adjusting the blade pitch of rotor 31. Oppositely threaded end portions of parts of rod 65 cooperate with oppositely threaded parts of nut 65′ to give pitch adjustment of one rotor with respect to the other. The embodiment of Fig. 2 includes a drive motor 34 carried by the arm 6 in the same way as the drive motor 10, and this drive motor 34 drives an oil pump 35 which transmits oil under pressure through the branched conduit 36 to the pair of oil motors 37 and 38 which respectively carry and drive the rotors 30 and 31, these oil motors 37 and 38 respectively being directly connected to the universal joints 32 and 33. The branched conduit 36 is flexible, and for the sake of simplicity Fig. 2 does not show the oil reservoir or the conduits leading therefrom to the pump 35 and leading from the motors 37 and 38 back to the reservoir.

It is apparent that the embodiment of Fig. 2 also is capable of closely simulating the actual flight of a helicopter, although with the embodiment of Fig. 2 the flight of a helicopter having tandem rotors will be simulated.

Figs. 3 and 4 show another embodiment of the invention which is identical with that of Fig. 1 except for the differences noted below. Thus, according to the embodiments of Figs. 3 and 4 a pair of coaxial rotors are provided one above the other. Referring to Figs. 3 and 4 it will be seen that the structure includes an upper rotor 40 and a lower rotor 41. These rotors turn in opposite directions of rotation and are driven by the motor 42 through any suitable drive shaft and gear arrangement or through an oil pump driven by the motor 42 and connected through a suitable conduit to either a pair of oil motors respectively connected to the rotors 40 and 41 for turning the same in opposite directions, respectively, or to a single oil motor which through suitable gearing drives the rotors 40 and 41 in opposite directions, respectively. The collective pitch of each of the rotors 40 and 41 may be regulated independently of the pitch of the blades of the other rotor. As may be seen from Figs. 3 and 4, the adjustment of the blades of the rotors 40 and 41 is provided by connecting the lever 22 through a linkage 71, 72, 73 with the blade adjusting mechanism, this linkage being similar to that of the embodiments of Figs. 1 and 2. The axially shiftable rod 73 simultaneously adjusts the pitch of both rotors. To adjust the pitch of one of these rollers with respect to the other, rod 73 may be composed of two sections interconnected in the same way as the sections of the rod 60 of Fig. 2. The framework 27" of Figs. 3 and 4 carries two pairs of rudders 43 and 44 which are arranged in the slip stream of the rotors 40 and 41. Thus, the pair of rudders 43 extend longitudinally of the helicopter trainer, while the pair of rudders 44 extend transversely of the trainer. By suitable adjustment of these rudders, it is possible to produce horizontally acting forces from the thrust of the rotors, so that the entire apparatus can be inclined and can be moved horizontally on the surface of the body of liquid. Thus, referring to Fig. 4, it will be seen that the transverse rudders 44 have been turned to such a position that they produce a forwardly and downwardly directed inclination of the apparatus, and when the apparatus parts have the position shown in Fig. 4 the apparatus will move along the body of liquid to the left, as viewed in Fig. 4.

As may be seen from Figs. 3 and 4, each of the rudders 44 is connected through a rod 70, lever 69 and rod 68 with the stick 20 so that during forward and rearward turning of the stick both rudders are simultaneously turned about their horizontal axis. In Fig. 4 the position which the rudders 44 take when stick 20 is turned forwardly is illustrated as well as the pitch of the craft resulting from such movement of stick 20. At this time the craft is moving forwardly to the left as shown in Fig. 4. A corresponding linkage which is not shown connects the stick 20 with the rudders 43 for turning the latter when the stick 20 is laterally turned about an axis extending longitudinally of the craft.

In order to be able to connect the rudders with the pedals 19, the rods 68 (Fig. 6) are connected with a sleeve 80 through which the stick 20 extends, the sleeve 80 being turnable on the stick 20, the sleeve 80 being provided with a pair of opposed radially extending arms fixed thereto and pivotally connected at their outer ends to the rod 68, respectively, for this purpose. The sleeve 80 fixedly carries at its lower end an additional pair of radial arms respectively connected with cables 74 which are connected respectively to the pedals 19. Thus, when the pedals 19 are actuated the sleeve 80 turns about the axis of the stick 20 so as to turn the rudders 44 respectively in opposite directions through the linkages 68–70. Such operation of the rudders serves to steer the craft by turning it about a vertical axis.

With the embodiment of Figs. 3 and 4 it is possible to very closely simulate a helicopter having a pair of coaxial rotors.

None of the above-described embodiments of the invention use either complicated electronic controls or complex optical assemblies, so that with equipment of relatively low cost it is possible to provide a helicopter trainer of high instructive value.

When the structure of Fig. 1 is at rest with the rotors stationary and a pilot not yet on the apparatus, the framework 27 is in an elevated position because of the downward force provided by the weight of the drive motor 10 together with the oil pump 12 and rotor 11. A suitable unillustrated stop carried by the float 1 limits the upward movement of the framework 27. Also, at this time the additional float 17 is spaced upwardly from the surface 18 of the liquid. The length of the lever arm 6 is such that when the pilot sits down on the seat 8, the framework 27 together with the parts carried thereby move downwardly until the float 17 engages the body of liquid. Now when the drive motor 10 is started by the pilot, then the oil under pressure supplied by the pump 12 drives the oil motor 14 and the rotor 9 is driven. At this time the force of the spring 16 is such that the thrust of the rotor 9 is insufficient to raise the framework 27. Only when the speed of rotation of the rotor 9 is increased in order to increase this thrust does the framework 27 rise against the influence of the spring 16, so that the float 17 moves upwardly away from the body of liquid. This position of the framework 27 corresponds to a helicopter in flight. The pilot can now regulate the thrust of the rotor 9 in any desired manner with structures well-known in the helicopter art. A change in the thrust of the rotor 9 provides a change in the elevation of the float 17 together with the elevation of the seat 8 with respect to the surface 18 of the body of liquid.

When the control stick 20 is tilted, then the plane in which the rotor 9 rotates is also tilted in any desired direction as a result of the mounting provided by the universal joint 21. By suitably inclining the plane of rotation of the rotor 9, a horizontal component of force is obtained from the thrust of the rotor, and the float 1 is tilted in a corresponding direction. During forward flight, the plane of rotation of the rotor is inclined forwardly. This inclination of the plane of rotation of the rotor produces an inclination of the float and the framework 27. At the same time the float 1 together with the entire assembly moves in the direction of the horizontal component provided by the inclination of the rotor 9. Thus, by tilting the control stick 20 forwardly the pilot can produce a forward movement in the same way as with an actual helicopter, and the seat of the pilot will assume a forwardly inclined position corresponding to the seat of the pilot in an actual helicopter. The same holds true for inclination of the plane of rotation of the rotor 9 in any other direction. As was pointed out above, the hollow tubular members 24 and 25 limit the tilting of the float 1 and prevent submersion thereof.

The tail rotor 11 serves in the same way as in a conventional actual helicopter to counterbalance components of force produced by the rotor 9 which tend to turn the entire assembly about a vertical axis, and of course the tail rotor 11 may be used to provide turning movement in addition to that of the rotor 9 when it is desired to turn the apparatus about a vertical axis. The drive of the tail rotor 11 directly from the motor 10 together with the adjustment of the pitch of the blades of the rotor 11 by the pedals 19 enables the thrust of the rotor 11 to be adjusted.

With the blade pitch adjusting lever 22, it is possible for the pilot to adjust the collective pitch of the blades of the main rotor 9 while the latter is rotating, so that the thrust of the main rotor can be controlled, and these conditions closely approximate those of an actual helicopter where the pilot can also regulate the pitch of the rotor blades during flight. Also, as in an actual helicopter, by turning the rotatable handle 23 the output of the drive motor 10 may be regulated.

The position which an embodiment of the invention takes during movement corresponding to forward flight is shown in Fig. 4.

As was pointed out above, the actuation of the controls of the structure of the invention control the main rotor in such a way that movements of the seat of the pilot are produced which correspond exactly to the movements which are produced in an actual helicopter during flight, so that a pilot student can learn all of the details of controlling a helicopter with the structure of the invention.

The embodiments of Figs. 2–4 differ from that of Fig. 1 only with respect to the rotor arrangement, so that trainers may be provided which correspond to different types of helicopters. The control structure for the embodiments of Figs. 2–4 has not been described in detail because such control structure is very well known to those skilled in the art.

In all of the embodiments, the framework 27, 27', or 27" is counterbalanced by a counterweight. This is not absolutely essential, however, because instead of a counterweight a suitable spring may be provided, and also the above-described spring 16 may also serve to counterbalance the weight of the framework 27 and the pilot or a part of his weight.

It will be understood that each of the elements described above, or two or more together, may also find a useful application in other types of helicopter trainers differing from the types described above.

While the invention has been illustrated and described as embodied in floating helicopter trainers, it is not intended to be limited to the details shown, since various modifications and structural changes may be made without departing in any way from the spirit of the present invention.

What is claimed as new and desired to be secured by Letters Patent is:

1. In a rotorcraft trainer, in combination, a float adapted to float upon a body of liquid; a framework; mounting means mounting said framework on said float for elevational movement with respect thereto without changing the inclination of said framework with respect to said float; a pilot seat carried by said framework for movement therewith; and rotor means also carried by said framework for producing air forces which act on said framework, said rotor means being adapted to be controlled by a pilot on the pilot seat.

2. In a rotorcraft trainer, in combination, a float adapted to float upon a body of liquid; a framework; mounting means mounting said framework on said float for elevational movement with respect thereto without changing the inclination of said framework with respect to said float; a pilot seat carried by said framework for movement therewith; rotor means also carried by said framework for producing air forces which act on said framework, said rotor means being adapted to be controlled by a pilot on the pilot seat; and spring means connected to said framework and float for urging said framework toward said float and yieldably resisting movement of said framework upwardly away from said float.

3. In a rotorcraft trainer, in combination, a float adapted to float upon a body of liquid; a framework; a pilot seat and a rotor carried by said framework; and parallelogram linkage means interconnecting said framework with said float for mounting said framework for movement in elevation with respect to said float without changing the inclination of said framework with respect to said float.

4. In a rotorcraft trainer, in combination, a first float; a framework; a pilot seat and a rotor carried by said framework; mounting means mounting said framework on said first float for elevational movement for respect thereto without changing the inclination of said framework with respect to said first float; and a second float carried by said framework, located beyond said first float, and adapted to engage the surface of a body of liquid for contributing to the support of said framework together with the pilot seat and rotor carried thereby when the trainer is at rest.

5. In a rotorcraft trainer, in combination, a float adapted to float upon the surface of a body of liquid; a framework; a pilot seat and a rotor carried by said framework; mounting means mounting said framework on said float for elevational movement with respect thereto without changing the inclination of said framework with respect to said float; and counterbalance means carried by said mounting means for counterbalancing the weight of said framework and pilot seat together with the weight of a pilot.

6. In a rotorcraft trainer, in combination, a float adapted to float upon the surface of a body of liquid; a framework; a pilot seat and a rotor carried by said framework; parallelogram linkage means carried by said float and connecting said framework to said float for elevational movement with respect thereto without changing the inclination of said framework with respect to said float; an elongated arm fixed to and extending from part of said parallelogram linkage means; and counterweight means carried by said arm for counterbalancing the weight of the framework and seat together with a pilot.

7. In a rotorcraft trainer, in combination, a float adapted to float upon the surface of a body of liquid; a framework; a pilot seat and a rotor carried by said framework; mounting means mounting said framework on said float for elevational movement with respect thereto without changing the inclination of said framework with respect to said float; and counterbalance means carried by said mounting means for counterbalancing the weight of said framework and pilot seat together with the weight of a pilot, said counterbalancing means being in the form of a drive motor for driving the rotor.

8. In a rotorcraft trainer, in combination, a float adapted to float upon a body of liquid; a framework; mounting means mounting said framework on said float for elevational movement with respect thereto without changing the inclination of said framework with respect to said float; a pilot seat carried by said framework for movement therewith; rotor means also carried by said framework for producing air forces which act on said framework, said rotor means being adapted to be controlled by a pilot on the pilot seat; and an oil motor operatively connected to said rotor means for driving the same.

9. In a rotorcraft trainer, in combination, a float adapted to float upon a body of liquid; a framework; mounting means mounting said framework on said float for elevational movement with respect thereto without changing the inclination of said framework with respect to said float; a pilot seat carried by said framework for movement therewith; rotor means also carried by said framework for producing air forces which act on said framework, said rotor means being adapted to be controlled by a pilot on the pilot seat; an oil motor operatively connected to said rotor means for driving the same; a drive motor carried by said mounting means; an oil pump connected to said drive motor to be driven thereby; and conduit means leading from said oil pump to said oil motor for driving the latter, said drive motor and oil pump acting as a counterweight for the framework.

10. In a rotorcraft trainer, in combination, a float adapted to float upon a body of liquid; a framework; mounting means mounting said framework on said float for elevational movement with respect thereto without changing the inclination of said framework with respect to said float; a pilot seat carried by said framework for movement therewith; rotor means also carried by said framework for producing air forces which act on said framework, said rotor means being adapted to be controlled by a pilot on the pilot seat; and a tail propeller carried by said framework at a part thereof distant from said seat and adapted to be controlled from said seat.

11. In a rotorcraft trainer, in combination, a float adapted to float upon a body of liquid; a framework; mounting means mounting said framework on said float for elevational movement with respect thereto without changing the inclination of said framework with respect to said float; a pilot seat carried by said framework for movement therewith; rotor means also carried by said framework for producing air forces which act on said framework, said rotor means being adapted to be controlled by a pilot on the pilot seat; an oil motor operatively connected to said rotor means for driving the same; a drive motor carried by said mounting means; an oil pump connected to said drive motor to be driven thereby; conduit means leading from said oil pump to said oil motor for driving the latter, said drive motor and oil pump acting as a counterweight for the framework; and a tail propeller carried by said framework and operatively connected to said drive motor to be driven thereby.

12. In a rotorcraft trainer, in combination, a float adapted to float upon a body of liquid; a framework; mounting means mounting said framework on said float for elevational movement with respect thereto without changing the inclination of said framework with respect to said float; a pilot seat carried by said framework for movement therewith; rotor means also carried by said framework for producing air forces which act on said framework, said rotor means being adapted to be controlled by a pilot on the pilot seat; and conventional helicopter controls located adjacent said seat and carried by said framework, said controls being adapted to control the operating position and drive of said rotor means.

13. In a rotorcraft trainer, in combination, a float adapted to float upon a body of liquid; a framework; mounting means mounting said framework on said float for elevational movement with respect thereto without changing the inclination of said framework with respect to said float; a pilot seat carried by said framework for movement therewith; rotor means also carried by said framework for producing air forces which act on said framework, said rotor means being adapted to be controlled by a pilot on the pilot seat; and means carried by said float for limiting the inclination thereof in a body of liquid.

14. In a rotorcraft trainer, in combination, a float adapted to float upon a body of liquid; a framework; mounting means mounting said framework on said float for elevational movement with respect thereto without changing the inclination of said framework with respect to said float; a pilot seat carried by said framework for movement therewith; rotor means also carried by said framework for producing air forces which act on said framework, said rotor means being adapted to be controlled by a pilot on the pilot seat; and means carried by said float for limiting the inclination thereof in a body of liquid, said float inclination limiting means being in the form of at least one elongated tubular member carried by said float at an outer part thereof.

References Cited in the file of this patent

UNITED STATES PATENTS

| | | |
|---|---|---|
| 1,825,363 | Robertson | Sept. 29, 1931 |
| 2,319,115 | Crowell | May 11, 1943 |
| 2,373,653 | Barber | Apr. 17, 1945 |
| 2,493,482 | Fish | Jan. 3, 1950 |
| 2,524,238 | Soule | Oct. 3, 1950 |
| 2,711,594 | Hickey | June 28, 1955 |

FOREIGN PATENTS

| | | |
|---|---|---|
| 1,106,756 | France | July 27, 1955 |

OTHER REFERENCES

Flight-Simulation for Helicopters, The Aeroplane, Dec. 10, 1954, pages 847 to 849.